May 10, 1966     M. O. COULTER ETAL     3,250,017

AFTER-TREATMENT OF PARTICULATE SOLIDS

Filed April 25, 1963

INVENTORS
MICHAEL OLIVER COULTER
DEREK COLIN McLEAN

BY Wenderoth, Lind & Ponack

ATTORNEYS

3,250,017
AFTER-TREATMENT OF PARTICULATE SOLIDS
Michael Oliver Coulter, Holmes Chapel, near Crewe, and Derek Colin McLean, Sandbach, England, assignors to Murgatroyd's Salt and Chemical Company Limited, Sandbach, England, a company of Great Britain
Filed Apr. 25, 1963, Ser. No. 275,714
Claims priority, application Great Britain, May 10, 1962,
17,941/62
5 Claims. (Cl. 34—10)

The invention relates to a method for effecting heat transfer between gases and solids and in particular between gases and particulate solids in a fluidized system.

According to the present invention a method for effecting heat transfer between a gas stream and a particulate solid by feeding the solid into a zone bounded on its underside by a retaining plate and maintaining solid in the zone as a fluidized layer by passage of the gas stream through openings in the retaining plate into and through the particulate solid is characterised in that solid is caused to pass horizontally through the fluidized layer which is maintained at a depth of ½ to 6" and the total cross sectional area of the openings in the retaining plate is such that the pressure drop across the plate is within the range 0.1 to 6" water gauge.

The above invention will be described hereinafter with particular reference to the cooling of hot dried salt but the invention is not limited to such a process and may be employed for the heating or cooling or even drying of other particulate solids.

In the manufacture of salt it is desirable that the stoved salt which leaves the driers at 130–180° C. should be cooled before entering storage silos or bulk transporters in order to facilitate subsequent handling and packing and also to satisfy industrial demands for delivery of bulk salt at a relatively low temperature. By the method of the present invention it has been found possible to reduce the temperature of the salt to satisfy such needs economically with comparatively small equipment.

In the method of the present invention the solid is maintained as a fluidized layer, and solid is caused to pass through the layer. Moreover the amount of free space necessary above the layer for the disentrainment of solid is less with shallow layers and leads to a more compact apparatus. The solid is caused to pass through the layer horizontally, cross current to the rising gas stream by introduction of fresh solid at one end of the layer and removal of solid from the other end. The advantages of such cross current flow are firstly that the system is continuous and acts as a conveyor and secondly that the mean temperature difference between the gas stream and solid is greater than in a system without cross current flow where the layer is isothermal. A further advantage is that the air will leave the cooler at a higher temperature and may be advantageously employed for example as part of the supply of air to a continuous drier in which the material may be dried before entering the cooler.

In order to ensure true cross current flow of the solid the fluidized layer is preferably long and narrow, and a suitable path length may be achieved, for instance, in a compact apparatus by means of a series of vertical baffles. The zone defining the fluidized layer may also contain additional heat exchange means such as steam or water coils to obtain the desired degree and rate of heat transfer.

The fluidized layer is essentially a shallow layer of depth ½ to 6". A particularly suitable depth for use in cooling stoved salt is about 2". Particular advantages of using layers of this type are that the quality of fluidization, especially with dried salt, is improved, good heat transfer is obtained and the power consumption for maintaining such a system is less than with deeper layers.

The retaining plate may take the form of a porous tile or stone, or of a perforated plate of metal or other material having suitable mechanical and corrosive resistant properties for the particular application. The material and design of the retaining plate is preferably chosen so as to provide a pressure drop across the plate within the range of 0.2 to 2" water gauge. With a drilled plate it will be appreciated that the size and distribution of the holes will depend upon the material being fluidized. Preferably such a plate should be drilled with holes larger than the largest solid particle but small enough substantially to prevent the flow of solid therethrough when the gas stream is stopped. In the cooling of dried salt it has been found that a plate made from a corrosion resistant metal e.g. aluminum or "Monel" having $\frac{1}{16}$" diameter holes at $\frac{1}{2}$" centers in triangular arrangement provides a suitable design. It has been found that by use of a porous tile or stone or by designing a plate in accordance with the above conditions to provide the correct pressure drop appreciable variations in the depth of the fluidized layer can be accommodated without any serious departure from uniform fluidization.

The gas stream employed to fluidize the solid and act as coolant may be any suitable gas or mixture of gases inert under the conditions prevailing during cooling. It is preferred to use air as the gas stream.

The invention is illustrated further with reference to the accompanying drawings in which.

Figure 1:
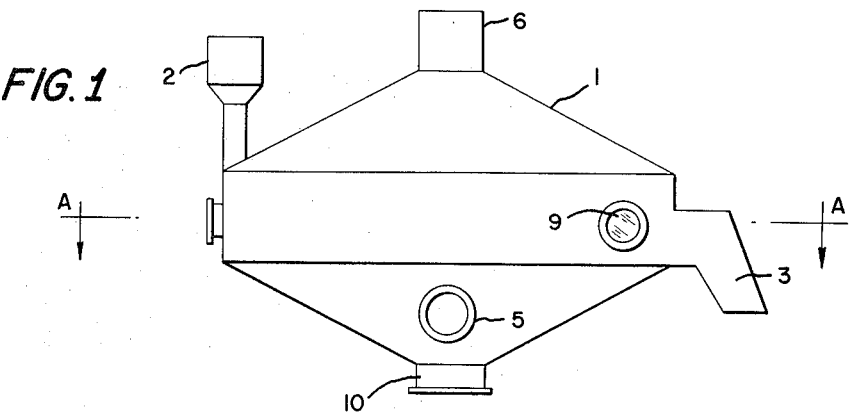
FIGURE 1 illustrates the side elevation of a fluidized cooler for the cooling of hot dried salt operating in accordance with the principles of the invention.
Figure 2:
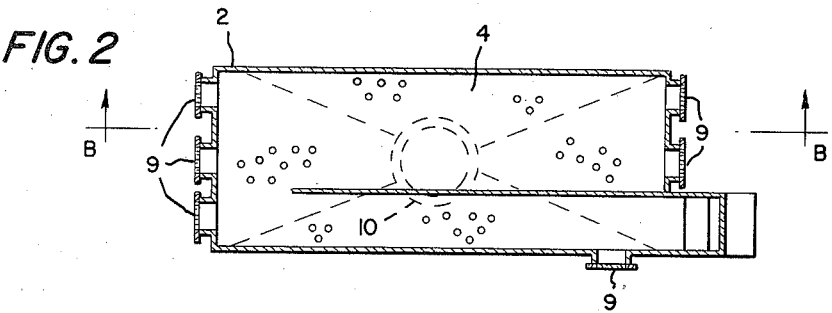
FIGURE 2 illustrates a plan in section of the cooler shown in FIGURE 1 along line A—A.
Figure 3:
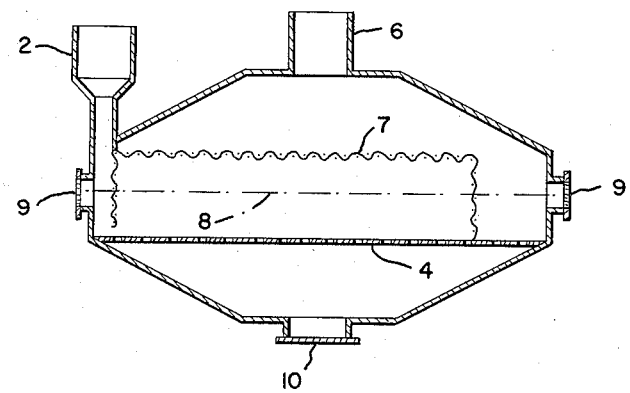
FIGURE 3 illustrates a side elevation in section of the cooler along the line B—B of FIGURE 2.

The cooler comprises a body 1, inlet hopper 2 and outlet chute 3. The inlet hopper delivers directly onto a perforated plate 4 through which is passed an ascending current of air which enters the cooler through inlet port 5 and leaves through outlet port 6. The perforated plate is divided into three portions by vertical screens 7 which cause the fluidized layer of material 8 supported above the plate to follow a long and narrow path. Sight holes 9 suitably positioned enable the operator to observe actual conditions prevailing within the cooler. Discharge port 10 serves for the removal of any small amount of solid material which falls through the perforated plate.

In operation hot salt from any known or conventional drier is first passed through a roughing screen to remove all lumps or cobs which are too large to be fluidized and which will otherwise accumulate within the cooler. The screened salt enters the cooler 1 through hopper 2, and is fluidized above the perforated plate by an ascending current of cool air. Continued feeding of salt into the cooler causes salt in the fluidized layer to pass horizontally through the cooler. The salt is cooled by contact with the fluidizing air which exits as a hot stream from the top of the cooler. Cooled salt is removed from the fluidized layer by overflow into the discharge chute 3 for storage bagging or bulk transport.

It will be appreciated that many modifications may be made to the above described apparatus without departing from the essential features of the invention.

We claim:

1. In a method for effecting heat transfer between a gas stream and hot dried particulate sodium chloride by feeding the sodium chloride into a zone bounded on its underside by a retaining plate and maintaining the sodium chloride in the zone as a fluidized layer by passage of the gas stream through openings in the retaining plate into and through the particulate sodium chloride, the improvement of passing the sodium chloride horizontally through the fluidized layer which is long and narrow as compared with its width and which is maintained at a depth of ½ to 6" and maintaining the pressure drop across the retaining plate within the range 0.1 to 6" water gauge.

2. A method as claimed in claim 1 wherein the gas stream is a stream of air.

3. A method as claimed in claim 1 wherein no substantial quantity of sodium chloride flows through the holes in the retaining plate when the gas stream is stopped.

4. A method as claimed in claim 1 wherein the pressure drop across the plate is within the range 0.2" to 2" water gauge.

5. A method as claimed in claim 1 wherein the fluidized layer of particulate sodium chloride is maintained at a depth of about 2".

References Cited by the Examiner

UNITED STATES PATENTS

| | | | |
|---|---|---|---|
| 1,472,314 | 10/1923 | Webster | 34—10 |
| 2,638,684 | 5/1953 | Jukkola | 34—10 |
| 2,666,269 | 1/1954 | Parry | 34—10 |
| 2,715,282 | 8/1955 | Niven | 34—57 |
| 2,797,908 | 7/1957 | Zubrzycki | 34—57 |
| 3,012,331 | 12/1961 | Oholm et al. | 34—57 |

FOREIGN PATENTS 509,909    1939    Great Britain.

WILLIAM F. O'DEA, *Primary Examiner.*

NORMAN YUDKOFF, *Examiner.*

F. E. DRUMMOND, D. A. TAMBURRO,
*Assistant Examiners.*